US012394305B2

(12) United States Patent
Gonzalez Vazquez et al.

(10) Patent No.: US 12,394,305 B2
(45) Date of Patent: Aug. 19, 2025

(54) VEHICLES, METHODS, COMPUTER PROGRAMS, AND APPARATUSES FOR RESOLVING A DEADLOCK TRAFFIC SITUATION OF AN AUTOMATICALLY OPERATED VEHICLE

(71) Applicant: VOLKSWAGEN AKTIENGESELLSCHAFT, Wolfsburg (DE)

(72) Inventors: Israel Gonzalez Vazquez, Wolfsburg (DE); Andreas Pfadler, Berlin (DE); Guillaume Jornod, Berlin (DE); Andreas Kwoczek, Lehre (DE)

(73) Assignee: VOLKSWAGEN AKTIENGESELLSCHAFT (DE)

( * ) Notice: Subject to any disclaimer, the term of this patent is extended or adjusted under 35 U.S.C. 154(b) by 409 days.

(21) Appl. No.: 17/464,349

(22) Filed: Sep. 1, 2021

(65) Prior Publication Data
US 2022/0076567 A1   Mar. 10, 2022

(30) Foreign Application Priority Data

Sep. 8, 2020   (EP) .................................... 20195050

(51) Int. Cl.
*G08G 1/01*   (2006.01)
*B60W 60/00*   (2020.01)
(52) U.S. Cl.
CPC ......... *G08G 1/0145* (2013.01); *B60W 60/001* (2020.02); *G08G 1/0133* (2013.01); *G08G 1/0141* (2013.01)
(58) Field of Classification Search
None
See application file for complete search history.

(56) References Cited

U.S. PATENT DOCUMENTS

2018/0039265 A1   2/2018   Lawler et al.
2018/0120854 A1*  5/2018   Buburuzan ...... G08G 1/096775
(Continued)

FOREIGN PATENT DOCUMENTS

CN   109448358 A   3/2019
CN   111497839 A   8/2020
(Continued)

OTHER PUBLICATIONS

Search Report for European Patent Application No. 20195050.8; Nov. 26, 2020.

(Continued)

*Primary Examiner* — Abby J Flynn
*Assistant Examiner* — Bakari Underwood
(74) *Attorney, Agent, or Firm* — BARNES & THORNBURG LLP (57) ABSTRACT

Transportation vehicles, methods, computer programs, and apparatuses for resolving a deadlock traffic situation in an automatically operated transportation vehicle. A method includes detecting the deadlock traffic situation, reporting the deadlock traffic situation to a control center, entering a tele-operated driving session in coordination with the control center, determining information on a reference location for the tele-operated driving session, forwarding the information on the reference location for the tele-operated driving session to other transportation vehicles, and resolving the deadlock traffic situation in the tele-operated driving session.

24 Claims, 5 Drawing Sheets

(56) References Cited

U.S. PATENT DOCUMENTS

| | | | |
|---|---|---|---|
| 2019/0011912 A1* | 1/2019 | Lockwood | G05D 1/0231 |
| 2019/0051159 A1* | 2/2019 | Wang | G08G 1/0133 |
| 2019/0163176 A1 | 5/2019 | Wang et al. | |
| 2019/0294159 A1 | 9/2019 | Pedersen et al. | |
| 2020/0201315 A1* | 6/2020 | Gogna | G01C 21/3453 |
| 2020/0242920 A1 | 7/2020 | Pfadler et al. | |

FOREIGN PATENT DOCUMENTS

| | | |
|---|---|---|
| EP | 3614356 A1 | 2/2020 |
| EP | 3690852 A1 | 8/2020 |

OTHER PUBLICATIONS

Office Action; Chinese Patent Application No. 202111048525.9; Jan. 12, 2024.
Office Action; Chinese Patent Application No. 202111048525.9; Jun. 14, 2024.

\* cited by examiner

VEHICLES, METHODS, COMPUTER PROGRAMS, AND APPARATUSES FOR RESOLVING A DEADLOCK TRAFFIC SITUATION OF AN AUTOMATICALLY OPERATED VEHICLE

PRIORITY CLAIM

This patent application claims priority to European Patent Application No. 20195050.8, filed 8 Sep. 2020, the disclosure of which is incorporated herein by reference in its entirety.

SUMMARY

Illustrative embodiments relate to transportation vehicles, methods, computer programs, and apparatuses for resolving a deadlock traffic situation in an automatically operated transportation vehicle, more specifically, but not exclusively, to a concept for coordinating communication traffic for transportation vehicles queuing at a deadlock traffic situation.

BRIEF DESCRIPTION OF THE DRAWINGS

Disclosed embodiments will be described with reference to the accompanying figures, in which.

DETAILED DESCRIPTION

Vehicular communication is a field of research and development. To enable an autonomous, automatic, or semi-autonomous driving of transportation vehicles, transportation vehicles are expected to use Vehicle-to-Vehicle-communication (V2V) and Vehicle-to-Network (V2N) communication, e.g., to coordinate driving maneuvers and/or to receive tele-operated driving instructions. This communication is generally wireless, i.e., transportation vehicles may wirelessly communicate with other transportation vehicles in their vicinity and/or with backend services via cellular mobile communication systems.

Tele-operated driving (ToD) is getting more and more interest. The main concept of ToD is an automated vehicle (AV) remotely driven by a control/command center (CC). CC and AV may be far away from each other. They are connected via a radio communication system (e.g., 4th, 5th Generation mobile communication systems (4G, 5G)) and its backhaul. Therefore, a certain end-to-end (E2E) delay and data rate are to be expected. The CC controls the automated vehicle (AV) via remote control. In direct control the CC directly controls one or more actuators of the AV.

Tele-operated driving (ToD) might become a key technology to solve issues with L4/L5 (L4: highly automatic, L5: fully automatic) driven transportation vehicles, such as interpretation issues or deadlocks (situations, which cannot be resolved by autonomous or automatic control mechanisms only). These issues occur when automatic driven vehicles (AV) are not able to interpret and to solve a situation (deadlock) due to unclear traffic conditions, e.g., an accident or a construction site. These transportation vehicles may need external instruction from someone else to solve the situation, which can be the CC. A ToD vehicle will be driven remotely in a ToD session by a CC, an operator therein, respectively.

Document US 2019/0294159 A1 describes methods and systems for remote support of autonomous operation of transportation vehicles. State indicators are generated by a first state display based on state data from a portion of transportation vehicles assigned to a respective first level control station. A second state display is generated for a second control station and displays state indicators for the state data of the transportation vehicles. A remote support interface including the first state display and image data received from a first transportation vehicle of the transportation vehicles is generated. Instruction data to the first transportation vehicle is transmitted using the remote support interface and based on an indication that the first transportation vehicle needs remote support, the instruction data modifying the autonomous operation of the first transportation vehicle. A workload between the first level control stations is allocated by assigning the transportation vehicles using the state indicators of the second state display.

Document US 2018/0039265 A1 provides a system and method that anticipates a particular coming failure in the automated transportation vehicle industry, which is that it will not actually be fully automated, and introduces a novel computer and processor-based mechanism for economically working around this deficiency, which is to provide on-demand access to over-subscribed banks of remote human operators.

The prior art concepts describe concepts for remote control and sharing information about an environment between vehicles/operators so the individual transportation vehicles can benefit from other sensor data. However, although improved environmental knowledge or models may also improve ToD, still in a deadlock situation, i.e., a situation that cannot be resolved by a transportation vehicle alone, further information on the environment does not help improving a signaling or resource efficiency of an overlaying communication system or with the signaling involved in tele-operating the transportation vehicles out of the respective situations.

There is a demand for an improved concept for ToD communication with transportation vehicles in deadlock situations. This demand is fulfilled according to the independent claims.

Disclosed embodiments are based on the finding that in most cases, an obstruction experienced by one transportation vehicle will be also be present for further transportation vehicles that have arrived or will arrive at the affected area. A first stopped transportation vehicle could also become an obstruction for the following transportation vehicles. When an AV needs support from the CC to resolve an event or deadlock, which is experienced by more than one AV, it is a finding that the CC will be contacted multiple times as other AVs start to arrive and face the same issue or even be blocked by another AV, which has arrived previously at the scene. Such events could lead to two situations:

First, it can create an overload at the CC, receiving multiple incoming calls originated by the queueing AV's, which are experiencing the same problem; and Second, even if the previous point is managed, an unordered operation of the AV can lead to an inefficient management or even more deadlocks. Disclosed embodiments therefore coordinate the request and the communication between the CC and one or more AVs arriving at a deadlock traffic situation. Disclosed embodiments enable transportation vehicles to determine and communicate a reference location for a ToD session, so other transportation vehicles can be made aware of an ongoing ToD session and determine their position in a queue.

Disclosed embodiments provide a method for resolving a deadlock traffic situation in an automatically operated transportation vehicle. The method comprises detecting the deadlock traffic situation and reporting the deadlock traffic situation to a control center. The method further comprises entering a tele-operated driving session in coordination with the control center and determining information on a reference location for the tele-operated driving session. The method further comprises forwarding the information on the reference location for the tele-operated driving session to other transportation vehicles and resolving the deadlock traffic situation in the tele-operated driving session. The information on the reference location for the ToD session enables the other transportation vehicles to discover or detect the ongoing ToD session and also figure out their position in the queue. Traffic overload at the CC may be reduced as transportation vehicles in the queue can refrain from generating any communication traffic with the CC until they have moved to the front of the queue.

For example, the method may comprise broadcasting the information on the reference location for the tele-operated driving session multiple times. Transportation vehicles arriving at the scene can be informed about the situation by receiving the broadcast message. Broadcast messages may enable an efficient way of communicating the information.

Moreover, status information on the tele-operated driving session may be broadcasted as well. Other transportation vehicles can thereby be made aware of the ToD session and its status so they can efficiently time their communication with a CC.

In some exemplary embodiments the method may comprise broadcasting information indicating an end of the tele-operated driving session. The other transportation vehicles may then determine when their time for entering a ToD session has come.

In further exemplary embodiments information on a time stamp of the tele-operated driving session may be broadcasted. Time stamp information can be used to identify a progress of an ongoing ToD session.

Disclosed embodiments provide another method for resolving a deadlock traffic situation in an automatically operated transportation vehicle. The method comprises receiving information on a tele-operated driving session for resolving the deadlock traffic situation from another transportation vehicle. The information on the tele-operated driving session comprises information on a reference location for the tele-operated driving session. The method further comprises determining a queuing position based on the information on the tele-operated driving session for resolving the deadlock traffic situation from the other transportation vehicle. The method further comprises communicating with a control center for resolving the deadlock traffic situation for the automatically operated transportation vehicle based on the queuing position. Determining the queuing position may enable the transportation vehicle to determine when to communicate with the CC and thereby avoid communication overhead through early communication.

The determining of the queuing position may comprise comparing a location of the automatically operated transportation vehicle with the information on the reference location for the tele-operated driving session. A transportation vehicle may conclude from its own location in relation to the location of the ToD session its position in the queue.

For example, the method may further comprise transferring into a queuing mode based on the queuing position and further comprising broadcasting information on the queuing mode to further transportation vehicles. Entering a queuing mode and informing other transportation vehicles thereon may contribute to an efficient coordination of the transportation vehicles in the queue.

The information on the queuing mode may comprises information indicating the queuing position and/or a queuing time of the automatically operated transportation vehicle. Such information may further contribute to coordination and organization of the queue, e.g., the determination of queuing positions for all transportation vehicles in the queue.

In some exemplary embodiments the method may further comprise receiving broadcast messages from one or more other transportation vehicles indicating that the one or more other transportation vehicles are in a queuing mode and the determining of the queuing position is further based on the queuing mode of the one or more other transportation vehicles. Evaluating messages on queuing modes of other transportation vehicles may enable an efficient determination of a queuing position, e.g., a sequential queuing of the transportation vehicles in at least one line (potentially also in multiple parallel queuing lines).

The method may further comprise engaging into a tele-operated driving session if the queuing position indicates that the automatically operated transportation vehicle is next in the queue to be tele-operated. Once a transportation vehicle reaches the beginning or the front of the queue it may engage in a ToD session. Utilization of communication resources may be delayed until this point and communication peaks may be avoided.

Moreover, the engaging into a tele-operated driving session may be carried out if information is received, which indicates an end of a tele-operated driving session of a transportation vehicle queuing directly in front of the automatically operated transportation vehicle. Delaying the engagement process until a transportation vehicle in front is done with its ToD session may further contribute to achieving a time distribution of the communication.

Another exemplary embodiment is an apparatus for resolving a deadlock traffic situation of a transportation vehicle. The apparatus comprises one or more interfaces configured to communicate in a communication network and a control module configured to control the one or more interfaces. The control module is further configured to perform one of the methods described herein. Yet another exemplary embodiment is a transportation vehicle comprising the apparatus.

Disclosed embodiments further provide a computer program having a program code for performing one or more of the described methods, when the computer program is executed on a computer, processor, or programmable hardware component. A further exemplary embodiment is a computer readable storage medium storing instructions which, when executed by a computer, processor, or programmable hardware component, cause the computer to implement one of the methods described herein.

Various example embodiments will now be described more fully with reference to the accompanying drawings in which some example embodiments are illustrated. In the figures, the thicknesses of lines, layers or regions may be exaggerated for clarity. Optional components may be illustrated using broken, dashed or dotted lines.

Accordingly, while example embodiments are capable of various modifications and alternative forms, embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of the disclosure. Like numbers refer to like or similar elements throughout the description of the figures.

As used herein, the term "or" refers to a non-exclusive or, unless otherwise indicated (e.g., "or else" or "or in the alternative"). Furthermore, as used herein, words used to describe a relationship between elements should be broadly construed to include a direct relationship or the presence of intervening elements unless otherwise indicated. For example, when an element is referred to as being "connected" or "coupled" to another element, the element may be directly connected or coupled to the other element or intervening elements may be present. In contrast, when an element is referred to as being "directly connected" or "directly coupled" to another element, there are no intervening elements present. Similarly, words such as "between", "adjacent", and the like should be interpreted similarly.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "includes" or "including", when used herein, specify the presence of stated features, integers, operations, elements or components, but do not preclude the presence or addition of one or more other features, integers, operations, elements, components or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Figure 1:
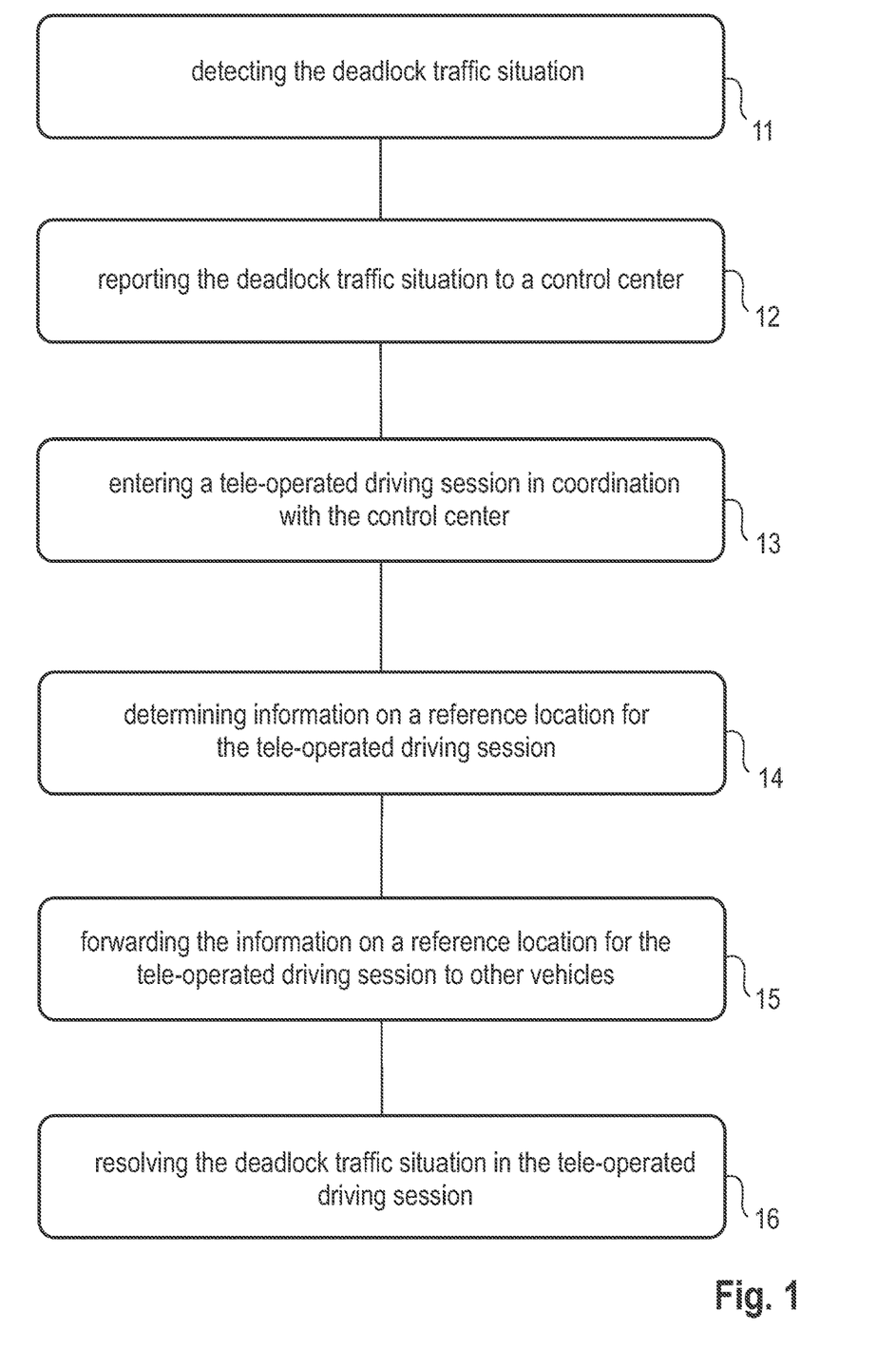
FIG. 1 illustrates a block diagram of an exemplary embodiment of a method for resolving a deadlock traffic situation in an automatically operated transportation vehicle.

FIG. 1 illustrates a block diagram of an exemplary embodiment of a method 10 for resolving a deadlock traffic situation in an automatically operated transportation vehicle. The method 10 comprises detecting, sensing or determining 11 the deadlock traffic situation and reporting 12 the deadlock traffic situation to a control center. The reporting 12 may comprise transmitting an according message to the control center using wireless communication, e.g., by a message defined for a mobile communication system. The control center can be implemented as a computer or server with an interface to communicate in a network, e.g., the internet or the mobile communication system to enable communication with transportation vehicles. The method 10 further comprises entering 13 a tele-operated driving session in coordination with the control center. The entering 13 may comprise setting up a ToD session or establishing a protocol context with the CC that allows the CC operator to remote control the transportation vehicle. The method 10 further comprises determining 14 information on a reference location for the tele-operated driving session. The information on the reference location may comprise relative or absolute location information that allows locating the ToD session or a starting point of the ToD session, e.g., based on a map, road meters on a road, etc. The method 10 further comprises forwarding 15 the information on the reference location for the tele-operated driving session to other transportation vehicles. The forwarding may comprise transmitting according information to the other transportation vehicles, e.g., using wireless communication. The method 10 comprises resolving 16 the deadlock traffic situation in the tele-operated driving session, e.g., determining a way or path to pass or overcome the deadlock traffic situation.

Figure 2:
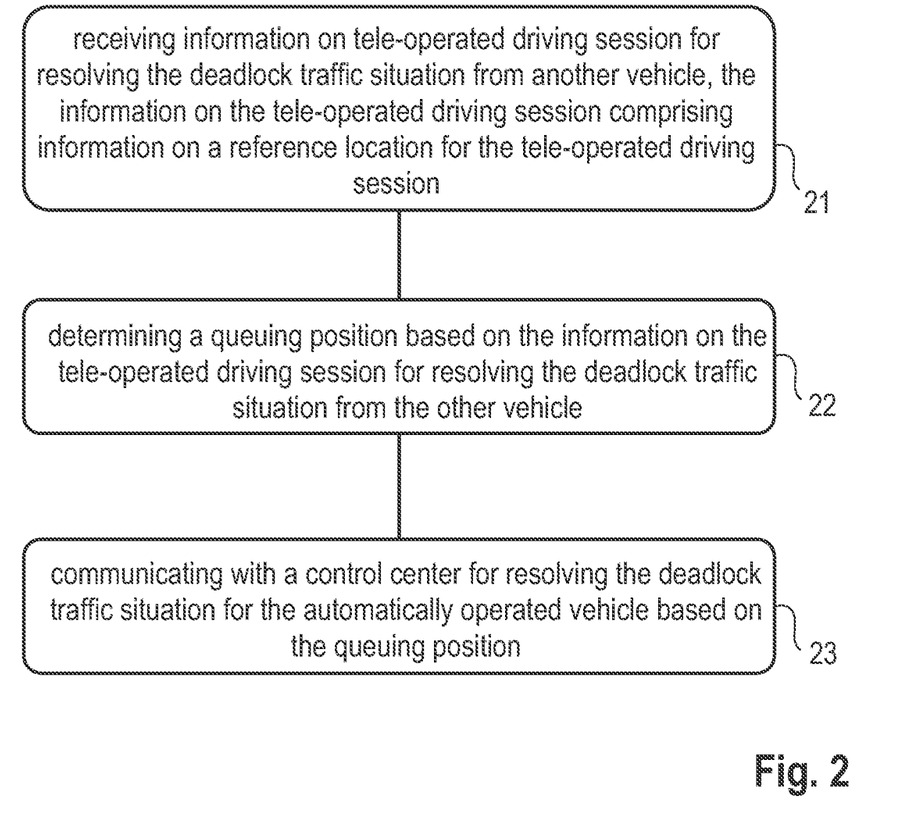
FIG. 2 illustrates a block diagram of an exemplary embodiment of another method for resolving a deadlock traffic situation in an automatically operated transportation vehicle.

FIG. 2 illustrates a block diagram of an exemplary embodiment of another method 20 for resolving a deadlock traffic situation in an automatically operated transportation vehicle. The method 20 comprises receiving 21 information on a tele-operated driving session for resolving the deadlock traffic situation from another transportation vehicle. The receiving 21 may comprise receiving an according message in a mobile communication system. The information on the tele-operated driving session comprises information on a reference location for the tele-operated driving session. The reference location is reproducible and allows determining a relative position or location of a receiver of the information to the reference location. The method 20 further comprises determining 22 a queuing position based on the information on the tele-operated driving session for resolving the deadlock traffic situation from the other transportation vehicle. The queuing position may, for example, determine a position within a line or sequence of transportation vehicles queuing up. In some disclosed embodiments there may be parallel lines and the queuing position may also indicate or determine the line a transportation vehicle is in. The method 20 further comprises communicating 23 with a control center for resolving the deadlock traffic situation for the automatically operated transportation vehicle based on the queuing position. As outlined above such communication may be carried out by wireless communication in a mobile communication system.

Figure 3:
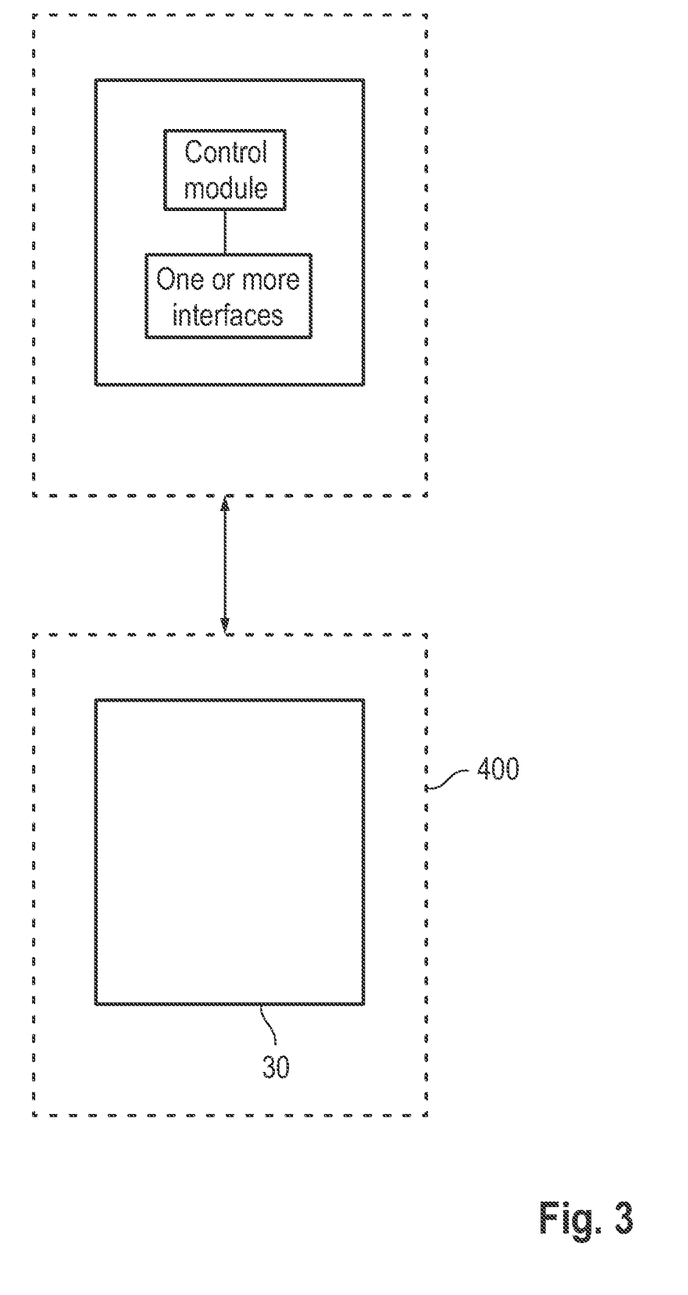
FIG. 3 illustrates a block diagram of an exemplary embodiment of an apparatus for resolving a deadlock traffic situation of a transportation vehicle and an exemplary embodiment of a transportation vehicle.

FIG. 3 illustrates a block diagram of an exemplary embodiment of an apparatus 30 for resolving a deadlock traffic situation of a transportation vehicle 300 and an exemplary embodiment of a transportation vehicle 300. The apparatus 30 comprises one or more interfaces 32 configured to communicate in a communication network and a control module 34, which is coupled to the one or more interfaces 32. The control module 34 is configured to control the one or more interfaces 32. The control module 34 is further configured to perform one of the methods 10, 20 as described herein. FIG. 3 further shows an exemplary embodiment of a transportation vehicle 300 comprising an exemplary embodiment of the apparatus 30. The transportation vehicle 300 is shown in broken lines as it is optional form the perspective of the apparatus 30. FIG. 3 also depicts another transportation vehicle 400 comprising an exemplary embodiment of the apparatus 30. For example, transportation vehicle 300 is carries out one of the methods 10 as described herein and transportation vehicle 400 carries out on of the methods 20 as described herein. In general, transportation vehicles may be configured to carry out both method 10, 20 in disclosed embodiments depending on whether they are first or subsequent at a deadlock traffic situation.

Disclosed embodiments may provide a method to reduce communication overhead when tele-operating transportation vehicles out of deadlock situations. Tele-operating the transportation vehicle is to be understood as a remote operation of the transportation vehicle. For example, a remote operator or tele-operator located at a control center (CC) takes over control of the transportation vehicle by control commands (e.g., acceleration/deceleration commands, steering commands, etc.).

Such a deadlock situation may be detected by the transportation vehicle 300 using onboard sensor systems. Such sensor information may also be used to develop an environmental model for the transportation vehicle 300. There are multiple options on determining the environmental information in exemplary embodiments. For example, information related to the environment may be obtained by sensor data of the transportation vehicle itself (video, radar, lidar, etc.) or through communication with other transportation vehicles, e.g., Vehicle-to-Vehicle (V2V, Car-to-Car) communication. Information related to the environment may comprise determining the information related to the environment based on sensor data shared among transportation vehicles in the environment of the transportation vehicle (data from sensors of other transportation vehicles).

The ToD performance is related to the communication link performance. The communication link may comprise a wireless part and wired part and a Quality of Service (QOS) may relate at least to the wireless part in some disclosed embodiments. For example, the communication link comprises the air interface (Uu link in 3GPP (3rd Generation Partnership Project), wireless part of the communication link) between the transportation vehicle and the base station (access node) and then the connection through the operator backbone (core network, wired part). Depending on the quality of the link, the control of the transportation vehicle will be adapted in exemplary embodiments: the transportation vehicle will be controlled directly (joystick-like) or indirectly (waypoints, or environmental model editions). The environment may be characterized by the type of road, e.g., highway, country road, city road, residential area road, number of lanes, traffic density, traffic dynamics, etc. Moreover, the time of day, the day of week, the weather, current traffic condition/density; and other factors may be comprised in the information related to the environment of the tele-operated transportation vehicle. Communicating all this information may consume significant bandwidth and radio capacity, which may be used more effectively in disclosed embodiments.

In exemplary embodiments, the information on the reference location of a ToD session may enable to identify the same deadlock situation or ToD session for another transportation vehicle. Identifying the same ToD may enable to determine a queuing position an appropriate time to start communicating with a CC. For example, the information on the reference location be an identifier number, which identifies a certain road section in a lane of a road.

For example, multiple transportation vehicles arrive subsequently at the same deadlock situation, e.g., an accident or a road construction. If all transportation vehicles enter a ToD session once they arrive at the deadlock situation a significant communication overhead occurs as all transportation vehicles communicate the same information to their CCs. The later arriving transportation vehicles are then moved out of the deadlock situation one by one in subsequent independent ToD sessions.

In exemplary embodiments, the forwarding of the information on the reference location allows subsequent transportation vehicles to make reference to the ToD session and also picture or figure out queuing settings in the deadlock situation. Moreover, this reference may allow a CC to identify the ToD session and make reuse of former information regarding the deadlock situation itself (accident, construction, blocking vehicle, pedestrian on the street, etc.) and information for resolving the deadlock situation, e.g., trajectory, alternative routes, waypoints, etc.

In exemplary embodiments the information on the reference location of the ToD session may comprise information of a location, which relates to the deadlock traffic situation and which is reproducible by a subsequent transportation vehicle approaching the deadlock traffic situation. For example, such information may be the above identifier. In another disclosed embodiment the information on the reference location comprises geographical coordinates identifying the ToD session. Geographical coordinates can also be reproducible, e.g., a point at which any automated transportation vehicle, is able to identify the deadlock traffic situation.

The apparatus 30 and the transportation vehicle 300 or control center may communicate at least partly through a mobile communication system. The mobile communication system, may, for example, correspond to one of the Third Generation Partnership Project (3GPP)-standardized mobile communication networks, where the term mobile communication system is used synonymously to mobile communication network. The messages (input data, control information) may hence be communicated through multiple network nodes (e.g., internet, router, switches, etc.) and the mobile communication system, which generates the delay or latencies considered in exemplary embodiments. For example, the uplink direction refers to the direction from a transportation vehicle to the command center and the downlink direction refers from the command center to the transportation vehicle.

The mobile or wireless communication system may correspond to a mobile communication system of the 5th Generation (5G, or New Radio) and may use mm-Wave technology. The mobile communication system may correspond to or comprise, for example, a Long-Term Evolution (LTE), an LTE-Advanced (LTE-A), High Speed Packet Access (HSPA), a Universal Mobile Telecommunication System (UMTS) or a UMTS Terrestrial Radio Access Network (UTRAN), an evolved-UTRAN (e-UTRAN), a Global System for Mobile communication (GSM) or Enhanced Data rates for GSM Evolution (EDGE) network, a GSM/EDGE Radio Access Network (GERAN), or mobile communication networks with different standards, for example, a Worldwide Inter-operability for Microwave Access (WIMAX) network IEEE 802.16 or Wireless Local Area Network (WLAN) IEEE 802.11, generally an Orthogonal Frequency Division Multiple Access (OFDMA) network, a Time Division Multiple Access (TDMA) network, a Code Division Multiple Access (CDMA) network, a Wideband-CDMA (WCDMA) network, a Frequency Division Multiple Access (FDMA) network, a Spatial Division Multiple Access (SDMA) network, etc.

Service provision may be carried out by a network component, such as a base station transceiver, a relay station or a UE, e.g., coordinating service provision in a cluster or group of multiple UEs/vehicles. A base station transceiver can be operable or configured to communicate with one or more active mobile transceivers/vehicles and a base station transceiver can be located in or adjacent to a coverage area of another base station transceiver, e.g., a macro cell base station transceiver or small cell base station transceiver. Hence, disclosed embodiments may provide a mobile communication system comprising two or more mobile transceivers/vehicles and one or more base station transceivers, wherein the base station transceivers may establish macro cells or small cells, as e.g., pico-, metro-, or femto cells. A mobile transceiver or UE may correspond to a smartphone, a cell phone, a laptop, a notebook, a personal computer, a Personal Digital Assistant (PDA), a Universal Serial Bus (USB)-stick, a car, a vehicle, a road participant, a traffic entity, traffic infrastructure etc. A mobile transceiver may also be referred to as User Equipment (UE) or mobile in line with the 3GPP terminology. A transportation vehicle may correspond to any conceivable method or mechanism for transportation, e.g., a car, a bike, a motorbike, a van, a truck, a bus, a ship, a boat, a plane, a train, a tram, etc.

A base station transceiver can be located in the fixed or stationary part of the network or system. A base station transceiver may be or correspond to a remote radio head, a transmission point, an access point, a macro cell, a small cell, a micro cell, a femto cell, a metro cell etc. A base station transceiver can be a wireless interface of a wired network, which enables transmission of radio signals to a UE or mobile transceiver. Such a radio signal may comply with radio signals as, for example, standardized by 3GPP or, generally, in line with one or more of the above listed systems. Thus, a base station transceiver may correspond to a NodeB, an eNodeB, a gNodeB, a Base Transceiver Station (BTS), an access point, a remote radio head, a relay station, a transmission point, etc., which may be further subdivided in a remote unit and a central unit.

A mobile transceiver or transportation vehicle can be associated with a base station transceiver or cell. The term cell refers to a coverage area of radio services provided by a base station transceiver, e.g., a NodeB (NB), an eNodeB (eNB), a gNodeB, a remote radio head, a transmission point, etc. A base station transceiver may operate one or more cells on one or more frequency layers, in some exemplary embodiments a cell may correspond to a sector. For example, sectors can be achieved using sector antennas, which provide a characteristic for covering an angular section around a remote unit or base station transceiver. A base station transceiver may operate multiple sectorized antennas. In the following, a cell may represent an according base station transceiver generating the cell or, likewise, a base station transceiver may represent a cell the base station transceiver generates.

The apparatus 30 may be comprised in a control center, a server, a base station, a NodeB, a UE, a transportation vehicle, a network component, a relay station, or any service coordinating network entity in disclosed embodiments. It is to be noted that the term network component may comprise multiple sub-components, such as a base station, a server, etc.

In exemplary embodiments the one or more interfaces 32 may correspond to any method or mechanism for obtaining, receiving, transmitting or providing analog or digital signals or information, e.g., any connector, contact, pin, register, input port, output port, conductor, lane, etc. which allows providing or obtaining a signal or information. An interface may be wireless or wireline and it may be configured to communicate, i.e., transmit or receive signals, information with further internal or external components. The one or more interfaces 32 may comprise further components to enable according communication in the (mobile) communication system, such components may include transceiver (transmitter and/or receiver) components, such as one or more Low-Noise Amplifiers (LNAs), one or more Power-Amplifiers (PAs), one or more duplexers, one or more diplexers, one or more filters or filter circuitry, one or more converters, one or more mixers, accordingly adapted radio frequency components, etc. The one or more interfaces 32 may be coupled to one or more antennas, which may correspond to any transmit and/or receive antennas, such as horn antennas, dipole antennas, patch antennas, sector antennas etc. In some examples the one or more interfaces 32 may serve the purpose of transmitting or receiving or both, transmitting and receiving, information, such as information, input data, control information, further information messages, etc.

As shown in FIG. 3 the respective one or more interfaces 32 are coupled to the respective control module 34 at the apparatus 30. In exemplary embodiments the control module 34 may be implemented using one or more processing units, one or more processing devices, any method or mechanism for processing, such as a processor, a computer or a programmable hardware component being operable with accordingly adapted software. In other words, the described functions of the control module 34 may as well be implemented in software, which is then executed on one or more programmable hardware components. Such hardware components may comprise a general-purpose processor, a Digital Signal Processor (DSP), a micro-controller, etc.

In disclosed embodiments, communication, i.e., transmission, reception or both, may take place among mobile transceivers/vehicles directly, e.g., forwarding input data or control information to/from a control center. Such communication may make use of a mobile communication system. Such communication may be carried out directly, e.g., by Device-to-Device (D2D) communication. Such communication may be carried out using the specifications of a mobile communication system. An example of D2D is direct communication between transportation vehicles, also referred to as Vehicle-to-Vehicle communication (V2V), car-to-car, Dedicated Short Range Communication (DSRC), respectively. Technologies enabling such D2D-communication include 802.11p, 3GPP systems (4G, 5G, NR and beyond), etc.

In exemplary embodiments, the one or more interfaces 32 can be configured to wirelessly communicate in the mobile communication system, e.g., between the apparatus 30 and the control center. To do so, radio resources are used, e.g., frequency, time, code, and/or spatial resources, which may be used for wireless communication with a base station transceiver as well as for direct communication. The assignment of the radio resources may be controlled by a base station transceiver, i.e., the determination which resources are used for D2D and which are not. Here and in the following radio resources of the respective components may correspond to any radio resources conceivable on radio carriers and they may use the same or different granularities on the respective carriers. The radio resources may correspond to a Resource Block (RB as in LTE/LTE-A/LTE-unlicensed (LTE-U)), one or more carriers, sub-carriers, one or more radio frames, radio sub-frames, radio slots, one or more code sequences potentially with a respective spreading factor, one or more spatial resources, such as spatial sub-channels, spatial precoding vectors, any combination thereof, etc. For example, in direct Cellular Vehicle-to-Anything (C-V2X), where V2X includes at least V2V, V2-Infrastructure (V2I), etc., transmission according to 3GPP Release 14 onward can be managed by infrastructure (so-called mode 3) or run in a UE.

For example, a first automated vehicle (AV) is in a deadlock situation. Multiple AVs were following it and are also stopping. If each AV detects its own deadlock situation, a cascade of ToD session requests is created, which would lead to an overload of the CC support system. The AVs are then in a queue or arrive at subsequent time instances and solve the deadlock situation. That way, an overload may occur, for example, as multiple parallel requests may be transmitted to a CC.

Disclosed embodiments may enable a ToD vehicle queueing assignment by creating methods to serve multiple AVs in an efficient way without overloading the CC and determining how to create a queue in a deadlock traffic situation.

At least for some exemplary embodiments it can be envisioned that four elements are key for the AVs to generate a self-organized queue, which are:

To know that there is an AV unit in a ToD session in execution, (CC is not free), To know the reference point where the "first AV" ToD session started, To know the exact time in which all the other AVs involved in the event have identified that a ToD session is in execution or queueing, and The establishment of a virtual barrier (see FIGS. 4 and 5) by the AV queueing units.

Figure 4:
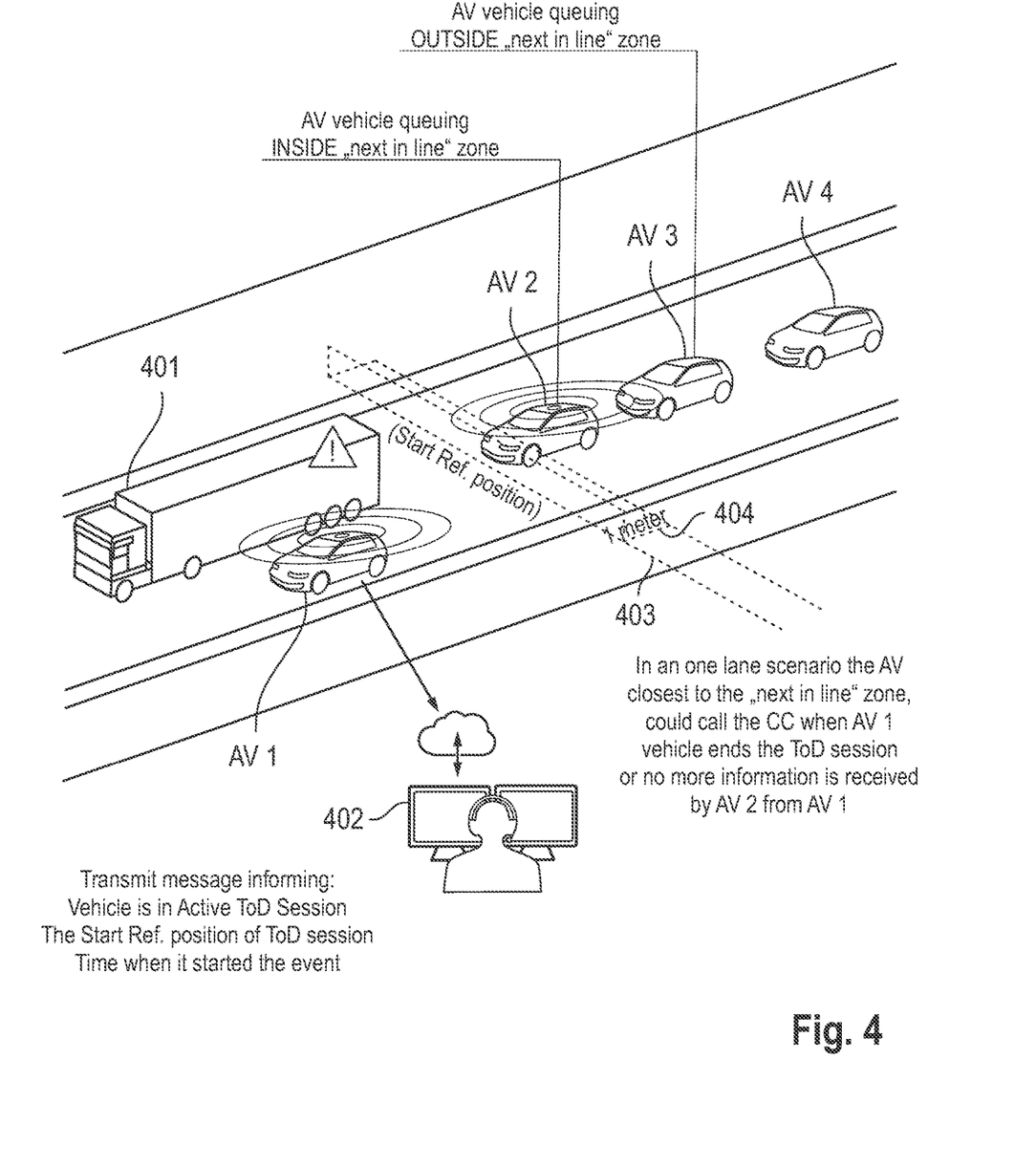
FIG. 4 illustrates an example of a deadlock traffic scenario in an exemplary embodiment.

FIG. 4 illustrates an example of a deadlock traffic scenario in an exemplary embodiment. FIG. 4 shows an example of an exceptional situation where autonomously or automatically driving transportation vehicles start queueing to receive tele-operating driving assistance in one single lane. FIG. 4 shows a two-lane road on which a truck 401 has broken down. A first automated transportation vehicle AV1 has already engaged in a ToD session with control center 402 and is remote-controlled by an operator to pass the truck 401 using the free lane of the oncoming traffic. Transportation vehicle AV2 is queuing behind a reference position 403, which also marks the beginning of a "next in line zone" 404, which, for example, is 1 m wide (may be 2 m, 3 m, etc. in other disclosed embodiments). Behind transportation vehicle AV2, transportation vehicles AV3 and AV4 queue up and so on ( . . . , AVn), outside the "next in line zone" 404.

Transportation vehicle AV1 transmits a message informing that transportation vehicle AV1 is in an active ToD session. The message includes a start reference position 403 of the ToD session and a time when it started the event. In the one lane scenario as depicted by FIG. 4 the AV closest to the "next in line zone" 403 could call the CC when AV1 ends the ToD session or no more information is received from AV1 at AV2.

Figure 5:
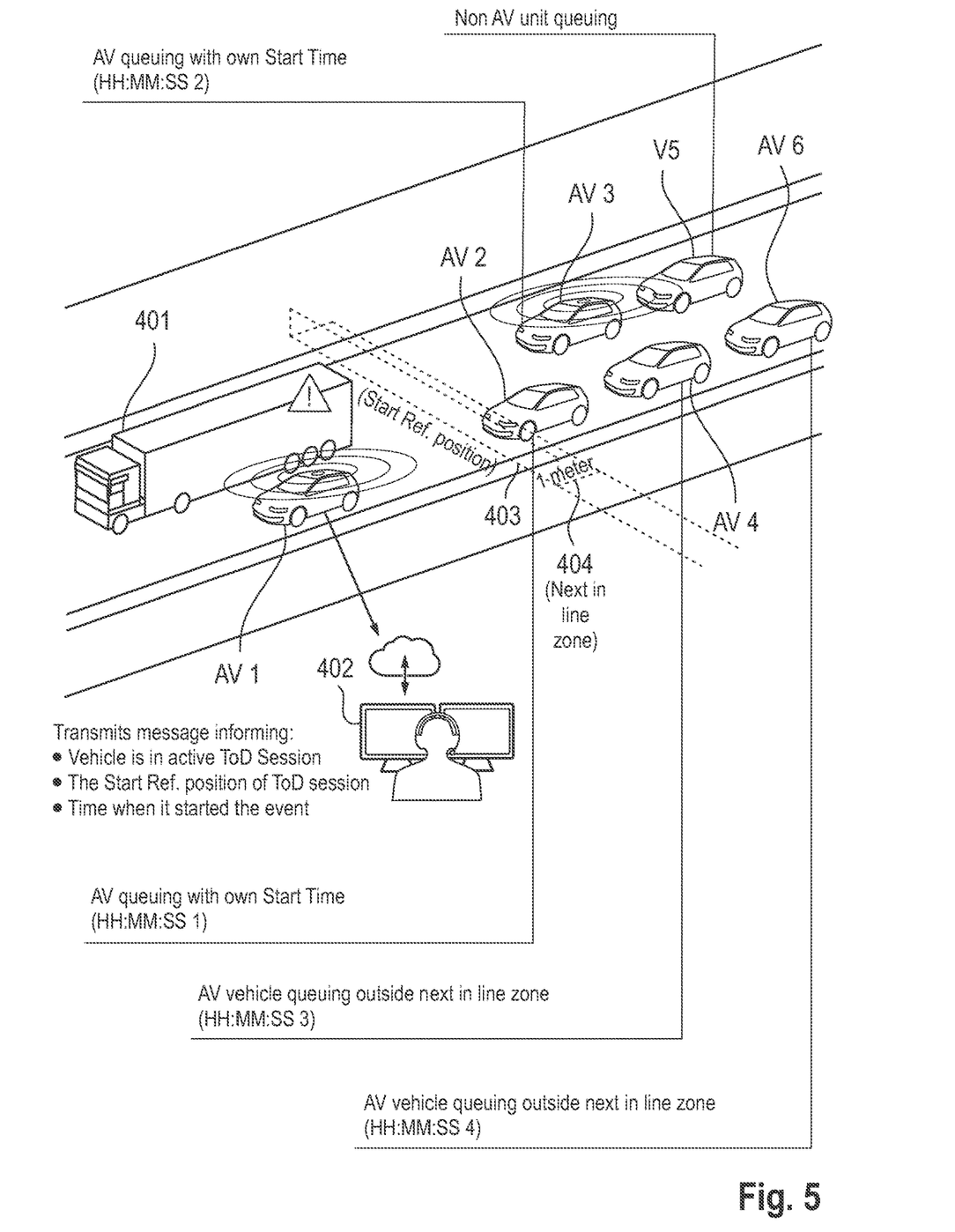
FIG. 5 illustrates another example of a deadlock traffic scenario in an exemplary embodiment.

FIG. 5 illustrates another example of a deadlock traffic scenario in an exemplary embodiment. FIG. 5 shows an example of an exceptional situation where autonomously or automatically driving transportation vehicles start queueing to receive tele-operating driving assistance in multiple lanes. FIG. 5 illustrates a similar scenario as FIG. 4. FIG. 5 shows a two-lane road on which a truck 401 has broken down. A first automated transportation vehicle AV1 has already engaged in a ToD session with control center 402 and is remote-controlled by an operator to pass the truck 401 using the free lane, but in this scenario it is a one way road with two lanes. The truck 401 blocks the right lane (from AVs perspective, so AVs need to use the left lane to pass the truck 401). Transportation vehicle AV2 is queuing on the left lane behind the reference position 403, which also marks the beginning of the "next in line zone" 404. Behind transportation vehicle AV2, transportation vehicles AV4 and AV6 queue up. In the right lane AV3 is queuing behind the reference position 403 and a non-automated transportation vehicle V5 is queuing behind AV3. AV2 and AV3 are in front of the queue and have already assigned arrival times based on which they determine the start times for their oncoming ToD sessions. AV4 and AV6 are outside the zone 404 and have also determined their starting times based on later arrival times. As outlined above, transportation vehicle AV1 transmits a message informing that transportation vehicle AV1 is in an active ToD session. The message includes a start reference position of the ToD session (defining 403 and 404) and a time when it started the event.

In these disclosed embodiments, the above method 10 is carried out by the first transportation vehicle and the method 20 is carried out by the subsequent transportation vehicles. The message of AV1 in both scenarios (FIG. 4 and FIG. 5) informs the other transportation vehicles about the fact that there is an AV unit in a ToD session in execution, (CC is not free), the reference point 403 where the "first AV" ToD session started, and the exact time in which all the other AVs involved in the event have identified that a ToD session is in execution or queueing. The method 10 comprises transmitting information on a time stamp of the tele-operated driving session.

The message is transmitted by the first AV in the event (AV1 in FIGS. 4 and 5) and a queueing AV will make use of the data in the following manner.

With the usage of the first element, an AV arriving at the scene will identify that in the area an "active" ToD session is taking place, from which it will set itself into a queueing mode and records/stores the specific time at which knowledge about the ToD session became known for it. For example, the determining 22 of the queuing position comprises comparing a location of the automatically operated transportation vehicle with the information on the reference location for the tele-operated driving session. This action triggers subsequently the transmission of its own state to other AVs informing that a queue has started to conform. The method 20 then comprises transferring into a queuing mode based on the queuing position and further comprises transmitting/broadcasting information on the queuing mode to further transportation vehicles. The information on the queuing mode may comprise information indicating the queuing position and/or a queuing time of the automatically operated transportation vehicle. Likewise, the method 20 may comprise receiving broadcast messages from one or more other transportation vehicles indicating that the one or more other transportation vehicles are in a queuing mode and the determining 22 of the queuing position is further based on the queuing mode of the one or more other transportation vehicles. The queuing mode may be defined as a state of being in a queue, waiting to move ahead in the queue up to a point at which a ToD session is started. While being in the queue, a transportation vehicle monitors its own progress in the queue, e.g., based on messages from transportation vehicles ahead in the queue, and provides message to other transportation vehicles, so they can determine their position and progress in the queue.

With the usage of the second element (the starting reference point) the second AV calculates how far it is away from the reference location 403. It may determine if it is close enough to the starting line 403 to reach out to the CC. This helps to identify and check if it is possible to initiate a call to the CC (next in queue position) or hold this procedure. This activity could be seen as the generation of a virtual barrier area 403, 404 to all queueing AVs arriving to the scene. Therewith, the situation of overload the CC with incoming calls of AVs that are queueing but far from the point in which could be supported can be relaxed. This barrier 403, 404 is drawn using the starting reference point to set a division line perpendicular to the street direction and add one meter of separation, cf. FIG. 4.

With an increasing number of AVs queueing at the deadlock situation, the previous process using the knowledge that an active ToD session is available and determining a distance of the transportation vehicles against the starting reference point is enough to organize and restrain the AVs from making unnecessary calls to the CC.

However, on streets with multiple lanes the scenario gets more complicated. In these cases the above third element (time) is used to identify which transportation vehicle in the virtual barrier area 404 is the next to call the CC, cf. FIG. 5. While in a single line no other AV could occupy the physical space of another transportation vehicle, being AV or not, in a multiple lane case the use of the proximity to the line 403 is not enough. In these situations, the time stamps used by the individual AVs to announce their queuing mode with their individual message transmissions can be used for comparison.

In this case, not only the AV that is closest to the starting reference point 403 but also the earliest in the scene can be identified as the one to have the right to call the CC next—once all the queueing AV vehicles detect that the first AV has ended the ToD session. This can be achieved through further broadcast messages by the first AV, the AV currently in the ToD session respectively. The method 10 may then further comprise broadcasting the information on the reference location for the tele-operated driving session multiple times, so later arriving transportation vehicles can be made aware of it. Moreover, status information on the tele-operated driving session may be broadcasted (e.g., "ToD is active", progress "x % completed", remaining time to completion, etc.). The method 10 may further comprise broadcasting information indicating an end of the tele-operated driving session, which would allow the next AV in line to start the engagement process with the CC.

The queueing transportation vehicles will be able to see if they should remain queueing (distance to reference point) or initiate the process to contact the CC (e.g., when an AV is inside of the virtual barrier area 404 and is the one which has arrived earliest at the scene). For example, the method 20 may comprise engaging into a tele-operated driving session if the queuing position indicates that the automatically operated transportation vehicle is next in the queue to be tele-operated (e.g., it is in front, and has longest waiting time). In some exemplary embodiments, engagement into a tele-operated driving session is performed at an automatically operated transportation vehicle if information is received, which indicates an end of a tele-operated driving session of a transportation vehicle queuing directly in front of the automatically operated transportation vehicle.

SUMMARIZING THE DISCLOSED EMBODIMENTS

FIG. 4 depicts a truck 401 blocking AVs on a single lane road.
1) AV1 had stopped and is been already supported via a ToD session,
2) AV1 transmits periodically a message, which informs the starting reference point 403, from where its ToD session took place, that the ToD session is "active" and its time stamp,
3) AV2 receives the transmission from AV1 informing it about its active ToD session, which triggers AV2 to set it in queueing mode, compare its actual position against AV1 starting reference position and transmit the time in which AV2 has gone into queueing mode and the starting reference position given by AV1,
4) The secondary message from AV2 informs queueing is in process and all AVs should set themselves in queueing mode,
5) All queueing AV units will then use the starting reference position plus one meter towards them to build a virtual barrier 403, 404,
6) AV2 being the closest to the starting reference point 403 knows that it is next in queue as it is inside the virtual barrier area 404, and
7) When AV1 transmission changes to ToD session ended, AV2 unit proceeds to establish connection with CC. Upon connection, the transmitted information from AV2 will change from queueing to active.

FIG. 5 depicts a truck 401 blocking AVs on a two or more lanes road.

Operations at 1 to 5 previously described for the scenario of FIG. 4 are executed, however as in this use case two AVs are inside of the virtual barrier zone 404, a further action is considered. The additional action incurs in the comparison of the time stamps provided of all AVs queueing. The AV unit which knows is in the zone 404 and has the earliest time is the one that has the right to call the CC, cf. 7 for FIG. 4.

As already mentioned, in exemplary embodiments the respective methods may be implemented as computer programs or codes, which can be executed on a respective hardware. Hence, another disclosed embodiment is a computer program having a program code for performing at least one of the above methods, when the computer program is executed on a computer, a processor, or a programmable hardware component. A further disclosed embodiment is a computer readable storage medium storing instructions which, when executed by a computer, processor, or programmable hardware component, cause the computer to implement one of the methods described herein.

A person of skill in the art would readily recognize that operations of various above-described methods can be performed by programmed computers, for example, positions of slots may be determined or calculated. Herein, some exemplary embodiments are also intended to cover program storage devices, e.g., digital data storage media, which are machine or computer readable and encode machine-executable or computer-executable programs of instructions where the instructions perform some or all of the operations of methods described herein. The program storage devices may be, e.g., digital memories, magnetic storage media such as magnetic disks and magnetic tapes, hard drives, or optically readable digital data storage media. The disclosed embodiments are also intended to cover computers programmed to perform the operations of methods described herein or (field) programmable logic arrays ((F)PLAs) or (field) programmable gate arrays ((F)PGAs), programmed to perform the operations of the above-described methods.

The description and drawings merely illustrate the principles of the disclosure. It will thus be appreciated that those skilled in the art will be able to devise various arrangements that, although not explicitly described or shown herein, embody the principles of the disclosure and are included within its spirit and scope. Furthermore, all examples recited herein are principally intended expressly to be only for pedagogical purposes to aid the reader in understanding the principles of the disclosure and the concepts contributed to furthering the art and are to be construed as being without limitation to such specifically recited examples and conditions. Moreover, all statements herein reciting principles and embodiments of the disclosure, as well as specific examples thereof, are intended to encompass equivalents thereof.

When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, Digital Signal Processor (DSP) hardware, network processor, application specific integrated circuit (ASIC), field programmable gate array (FPGA), read only memory (ROM) for storing software, random access memory (RAM), and non-volatile storage. Other hardware, conventional or custom, may also be included. Their function may be carried out through the operation of program logic, through dedicated logic, through the interaction of program control and dedicated logic, or even manually, the particular technique being selectable by the implementer as more specifically understood from the context.

It should be appreciated by those skilled in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Furthermore, the following claims are hereby incorporated into the detailed description, where each claim may stand on its own as a separate embodiment. While each claim may stand on its own as a separate embodiment, it is to be noted that—although a dependent claim may refer in the claims to a specific combination with one or more other claims—other embodiments may also include a combination of the dependent claim with the subject matter of each other dependent claim. Such combinations are proposed herein unless it is stated that a specific combination is not intended. Furthermore, it is intended to include also features of a claim to any other independent claim even if this claim is not directly made dependent to the independent claim.

It is further to be noted that methods disclosed in the specification or in the claims may be implemented by a device having methods or mechanisms for performing each of the respective operations of these methods.

LIST OF REFERENCE SIGNS

10 method for resolving a deadlock traffic situation in an automatically operated transportation vehicle
11 detecting the deadlock traffic situation
12 reporting the deadlock traffic situation to a control center
13 entering a tele-operated driving session in coordination with the control center
14 determining information on a reference location for the tele-operated driving session
15 forwarding the information on the reference location for the tele-operated driving session to other transportation vehicles
16 resolving the deadlock traffic situation in the tele-operated driving session
20 method for resolving a deadlock traffic situation in an automatically operated transportation vehicle
21 receiving information on a tele-operated driving session for resolving the deadlock traffic situation from another transportation vehicle, the information on the tele-operated driving session comprising information on a reference location for the tele-operated driving session
22 determining a queuing position based on the information on the tele-operated driving session for resolving the deadlock traffic situation from the other transportation vehicle
23 communicating with a control center for resolving the deadlock traffic situation for the automatically operated transportation vehicle based on the queuing position
30 apparatus for resolving a deadlock traffic situation of a transportation vehicle
32 one or more interfaces
34 control module
300 automated transportation vehicle
400 automated transportation vehicle
AV1 automated transportation vehicle
AV2 automated transportation vehicle
AV3 automated transportation vehicle
AV4 automated transportation vehicle
V5 transportation vehicle
AV6 automated transportation vehicle

The invention claimed is:

1. An apparatus for resolving a deadlock traffic situation of a transportation vehicle, the apparatus comprising:
   one or more interfaces to communicate in a communication network; and
   a control module to control the one or more interfaces, wherein the control module is configured to control the apparatus to resolve the deadlock traffic situation by:
      detecting the deadlock traffic situation,
      reporting the deadlock traffic situation to a control center,
      entering a tele-operated driving session in coordination with the control center at a starting point, which is a physical location of the transportation vehicle at a temporal point, wherein the entering is performed in response to the detection of the deadlock traffic situation,
      determining reference location information for the starting point of the tele-operated driving session, wherein the reference location information includes relative or absolute location information that enables other transportation vehicles to locate the starting point of the tele-operated driving session for resolving the deadlock traffic situation,
      transmitting tele-operated driving session information including the reference location information for the tele-operated driving session to the other transportation vehicles to create a physical queue based on the starting point so as to provide instructions for the other transportation vehicles to physically queue based on the starting point, and receive tele-operating driving assistance from the control center to resolve the deadlock traffic situation, and resolving the deadlock traffic situation, by the transportation vehicle, in the tele-operated driving session.

2. The apparatus of claim 1, wherein the control module is further configured to transmit the reference location information for the tele-operated driving session multiple times.

3. The apparatus of claim 1, wherein the control module is further configured to transmit tele-operated driving session status information.

4. The apparatus of claim 1, wherein the control module is further configured to transmit information indicating an end of the tele-operated driving session.

5. The apparatus of claim 1, wherein the control module is further configured to transmit information indicating a time stamp of the tele-operated driving session.

6. A transportation vehicle comprising the apparatus of claim 1.

7. The transportation vehicle of claim 6, wherein the transportation vehicle is an autonomously operated transportation vehicle.

8. The apparatus of claim 1, wherein the apparatus is in an autonomously operated transportation vehicle.

9. A method for resolving a deadlock traffic situation in a transportation vehicle, the method comprising:
    detecting the deadlock traffic situation;
    reporting the deadlock traffic situation to a control center;
    entering a tele-operated driving session in coordination with the control center at a starting point, which is a physical location of the transportation vehicle at a temporal point, wherein the entering is performed in response to the detection of the deadlock traffic situation;
    determining reference location information for the starting point of the tele-operated driving session, wherein the reference location information includes relative or absolute location information that enables other transportation vehicles to locate the starting point of the tele-operated driving session for resolving the deadlock traffic situation;
    transmitting tele-operated driving session information including the reference location information for the tele-operated driving session to the other transportation vehicles to create a physical queue based on the starting point, and receive tele-operating driving assistance from the control center to resolve the deadlock traffic situation; and
    resolving the deadlock traffic situation, by the transportation vehicle, in the tele-operated driving session.

10. The method of claim 9, further comprising transmitting the reference location information for the tele-operated driving session multiple times.

11. The method of claim 9, further comprising transmitting tele-operated driving session status information.

12. The method of claim 9, further comprising transmitting information indicating an end of the tele-operated driving session.

13. The method of claim 9, further comprising transmitting information indicating a time stamp of the tele-operated driving session.

14. The method of claim 9, wherein the transportation vehicle is in an autonomously operated transportation vehicle.

15. A method for resolving a deadlock traffic situation in an autonomously operated transportation vehicle, the method comprising:
    receiving tele-operated driving session information for resolving the deadlock traffic situation from another transportation vehicle, the tele-operated driving session information including reference location information for a starting point of a tele-operated driving session of the other transportation vehicle, which is a physical location of the other transportation vehicle at a temporal point, wherein the entering is performed in response to the detection of the deadlock traffic situation, wherein the reference location information for the tele-operated driving session includes relative or absolute location information that enables locating the starting point of the tele-operated driving session for resolving the deadlock traffic situation;
    determining a queuing position related to the starting point in a physical queue to receive tele-operating driving assistance from the control center based on the tele-operated driving session information received from the other transportation vehicle, wherein the physical queue is created based on the starting point of the other transportation vehicle; and
    communicating with a control center for resolving the deadlock traffic situation for the autonomously operated transportation vehicle based on the queuing position.

16. The method of claim 15, wherein the determining of the queuing position comprises comparing a location of the autonomously operated transportation vehicle with the reference location information for the tele-operated driving session.

17. The method of claim 15, further comprising:
    transferring into a queuing mode based on the queuing position; and
    broadcasting queuing mode information to further transportation vehicles.

18. The method of claim 17, wherein the queuing mode information includes information indicating the queuing position and/or a queuing time of the autonomously operated transportation vehicle.

19. The method of claim 15, further comprising receiving broadcast messages from one or more other transportation vehicles indicating that the one or more other transportation vehicles are in a queuing mode, wherein the determining of the queuing position is further based on the queuing mode of the one or more other transportation vehicles.

20. The method of claim 15, further comprising engaging in a tele-operated driving session in response to the queuing position indicating that the autonomously operated transportation vehicle is next in the queue to be tele-operated.

21. The method of claim 15, further comprising engaging in a tele-operated driving session in response to receipt of information indicating an end of a tele-operated driving session of a transportation vehicle queuing directly in front of the autonomously operated transportation vehicle.

22. The method of claim 15, wherein the transportation vehicle is an autonomously operated transportation vehicle.

23. A non-transitory computer readable medium includes a computer program having a program code for performing the method of claim 9, when the computer program is executed on a computer, a processor, or a programmable hardware component.

24. A non-transitory computer readable medium includes a computer program having a program code for performing the method of claim 15, when the computer program is executed on a computer, a processor, or a programmable hardware component.

* * * * *